(12) United States Patent
Ha et al.

(10) Patent No.: US 11,525,405 B2
(45) Date of Patent: *Dec. 13, 2022

(54) TURBINE APPARATUS

(71) Applicant: DOOSAN ENERBILITY CO., LTD, Changwon (KR)

(72) Inventors: Jin Woong Ha, Daejeon (KR); GeonHwan Cho, Gimhae (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,572

(22) Filed: Oct. 2, 2021

(65) Prior Publication Data

US 2022/0025819 A1 Jan. 27, 2022

Related U.S. Application Data

(63) Continuation-in-part of application No. 16/270,578, filed on Feb. 7, 2019, now Pat. No. 11,162,378.

(30) Foreign Application Priority Data

Mar. 7, 2018 (KR) .......................... 10-2018-0026867

(51) Int. Cl.
*F01D 11/00* (2006.01)
*F02C 7/28* (2006.01)
*F02C 3/04* (2006.01)

(52) U.S. Cl.
CPC .............. *F02C 7/28* (2013.01); *F01D 11/001* (2013.01); *F02C 3/04* (2013.01)

(58) Field of Classification Search
CPC ...... F01D 11/01; F01D 11/003; F01D 11/006; F01D 11/02; F01D 11/08; F01D 11/025; F01D 11/001; F05D 2240/55; F16J 15/3288; F16J 15/3248; F16J 15/4472; F16J 15/3232; F16J 15/00
See application file for complete search history.

(56) References Cited

U.S. PATENT DOCUMENTS

| | | | | |
|---|---|---|---|---|
| 8,794,918 | B2* | 8/2014 | Ali | F16J 15/164 415/230 |
| 11,162,378 | B2* | 11/2021 | Ha | F16J 15/442 |
| 2005/0206087 | A1* | 9/2005 | Hogg | F01D 11/02 277/355 |
| 2012/0027582 | A1* | 2/2012 | Natarajan | F16J 15/445 277/579 |
| 2013/0142628 | A1* | 6/2013 | Sheng | F16J 15/445 277/377 |

* cited by examiner

*Primary Examiner* — David E Sosnowski
*Assistant Examiner* — Maxime M Adjagbe
(74) *Attorney, Agent, or Firm* — Harvest IP Law LLP

(57) ABSTRACT

Disclosed is a turbine apparatus. The turbine apparatus includes s stator, a rotor rotatably installed in the stator, and a sealing mechanism provided to prevent a working fluid from leaking between the stator and the rotor. The sealing mechanism is configured such that when the rotor is stopped, the sealing mechanism is brought into contact with the rotor, and when the rotor is rotated, the sealing mechanism is formed to be spaced from the rotor by a predetermined gap.

20 Claims, 10 Drawing Sheets

[FIG. 1]
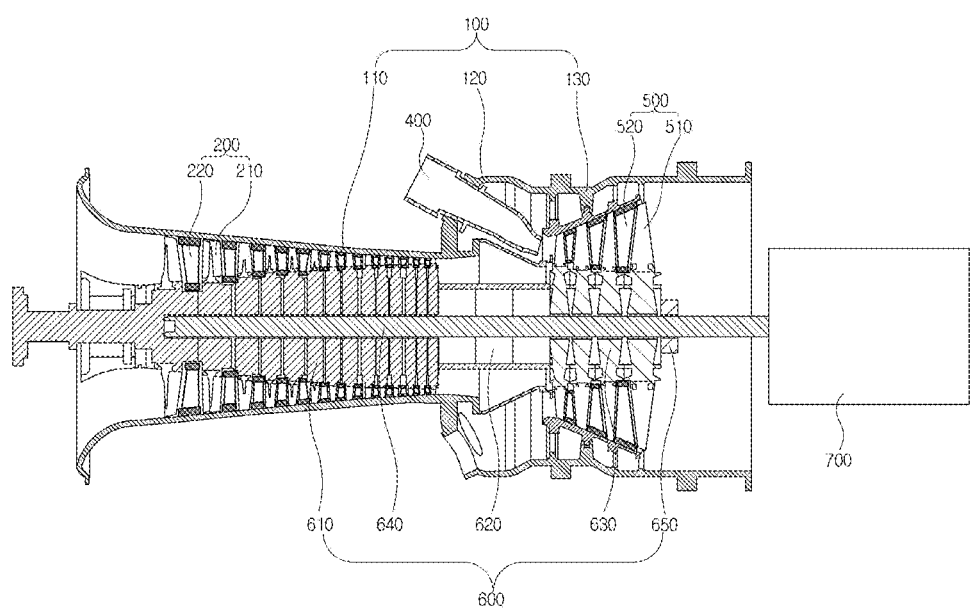

[FIG. 2]
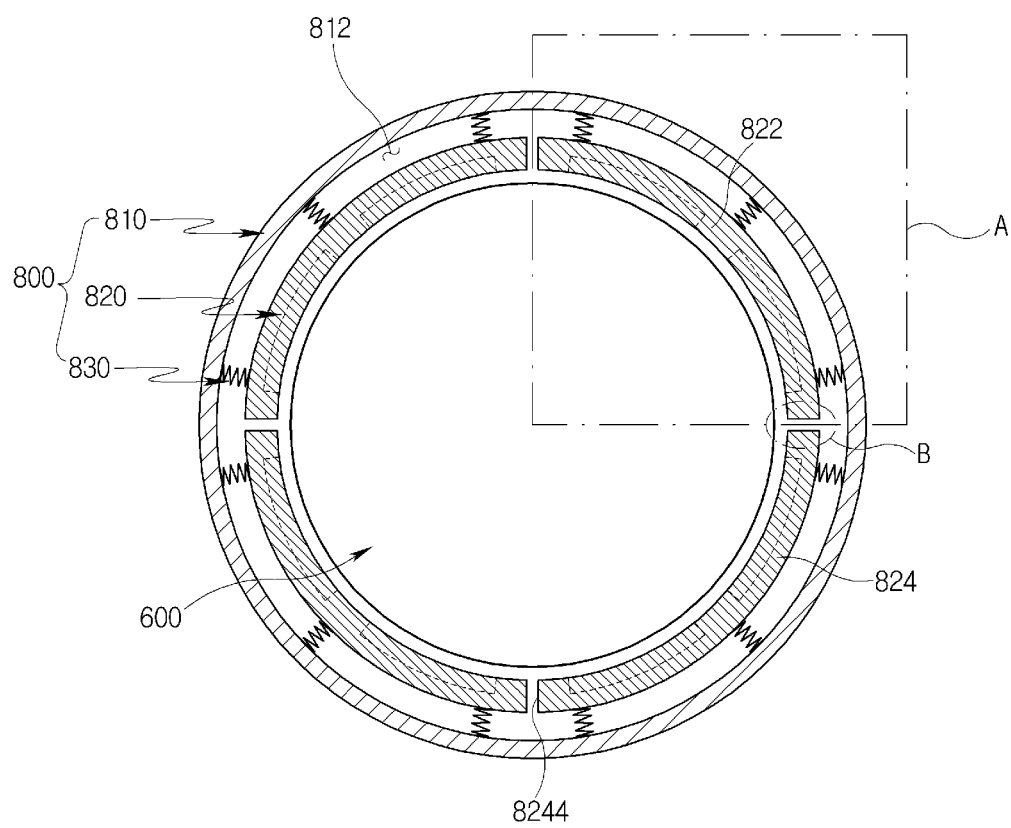

[FIG. 3]
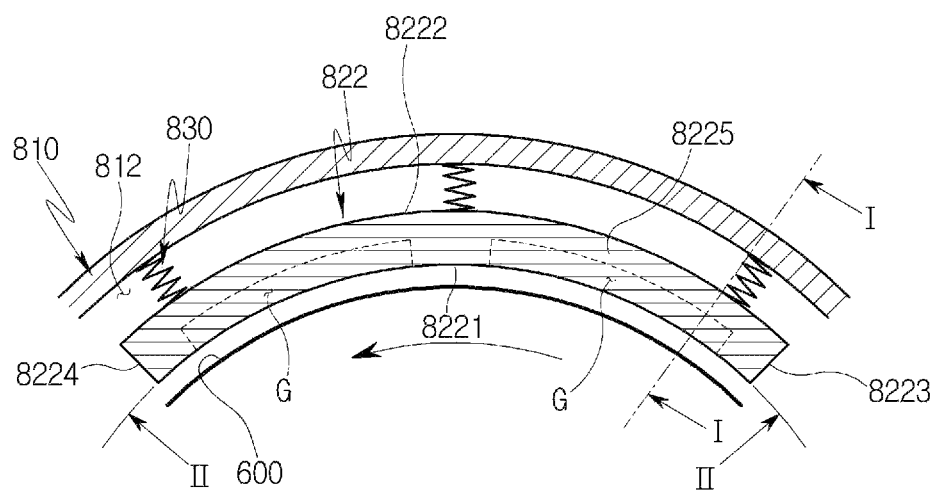

【FIG. 4】
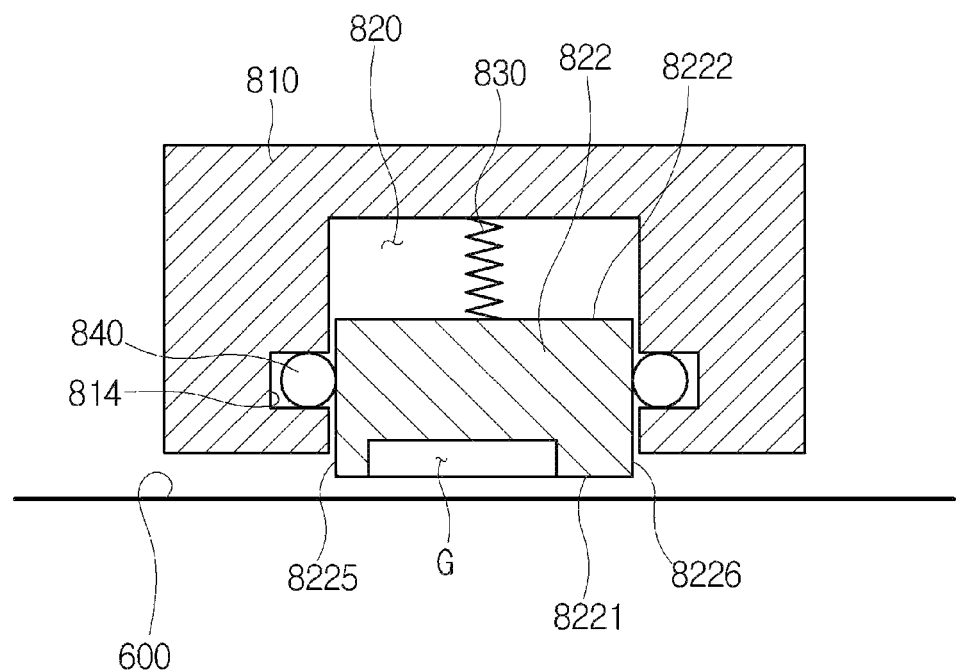
【FIG. 5】
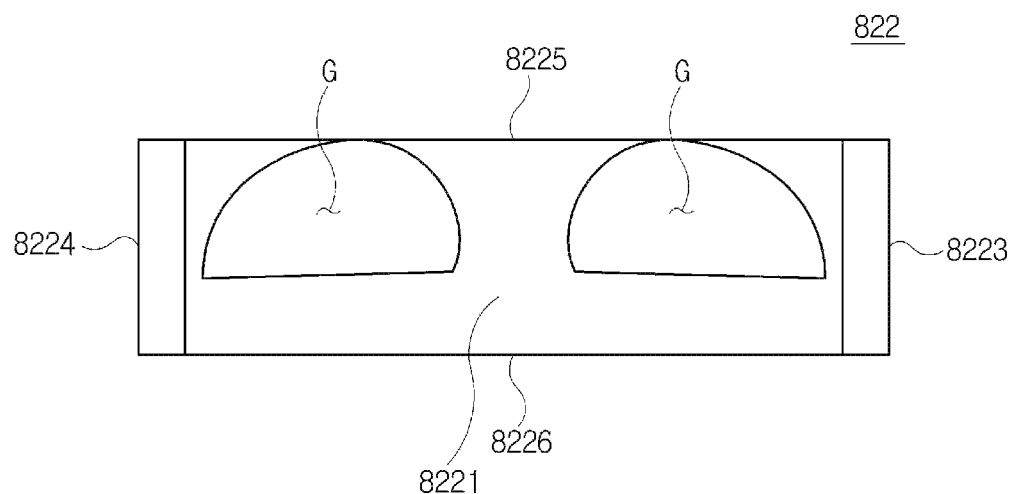

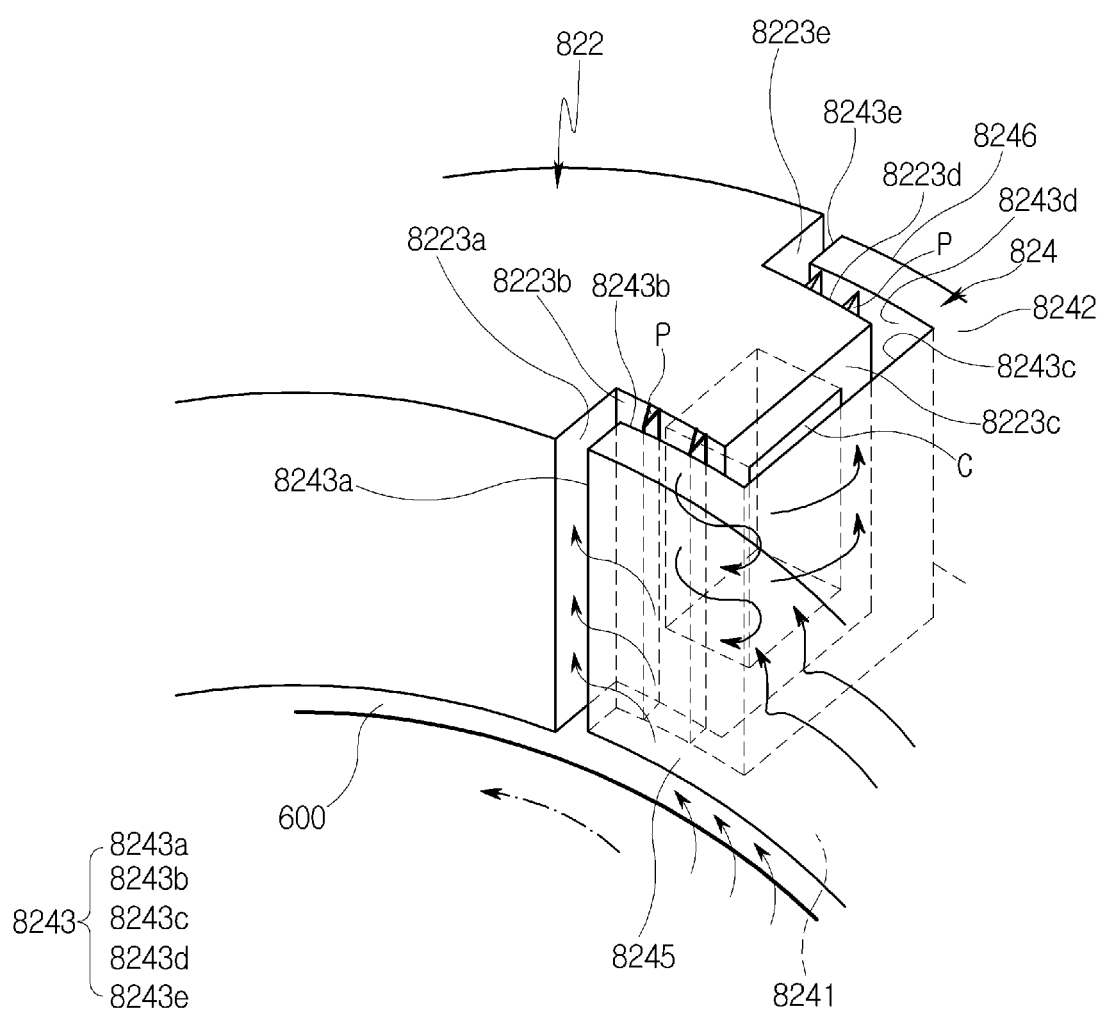
[FIG. 6]

[FIG. 7]
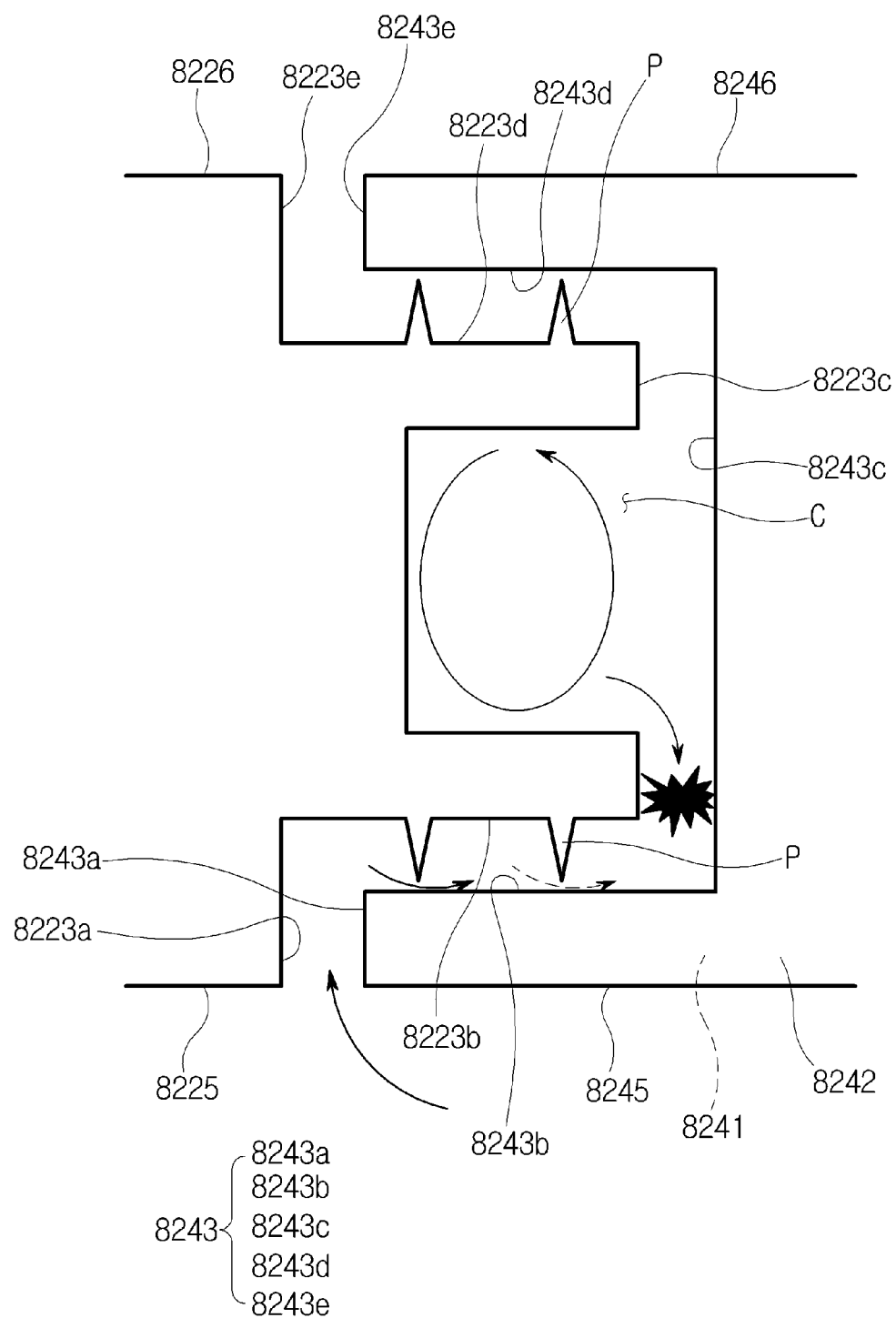

【FIG. 8】
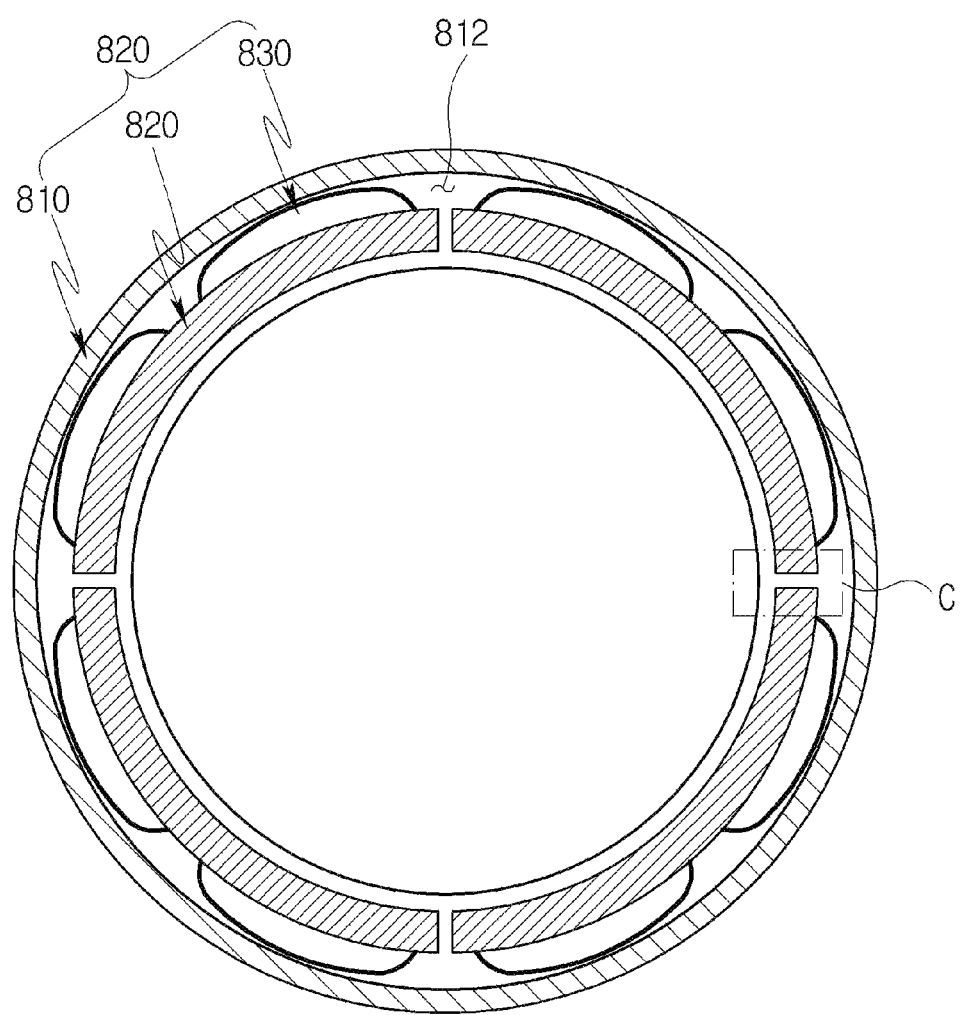

[FIG. 9]
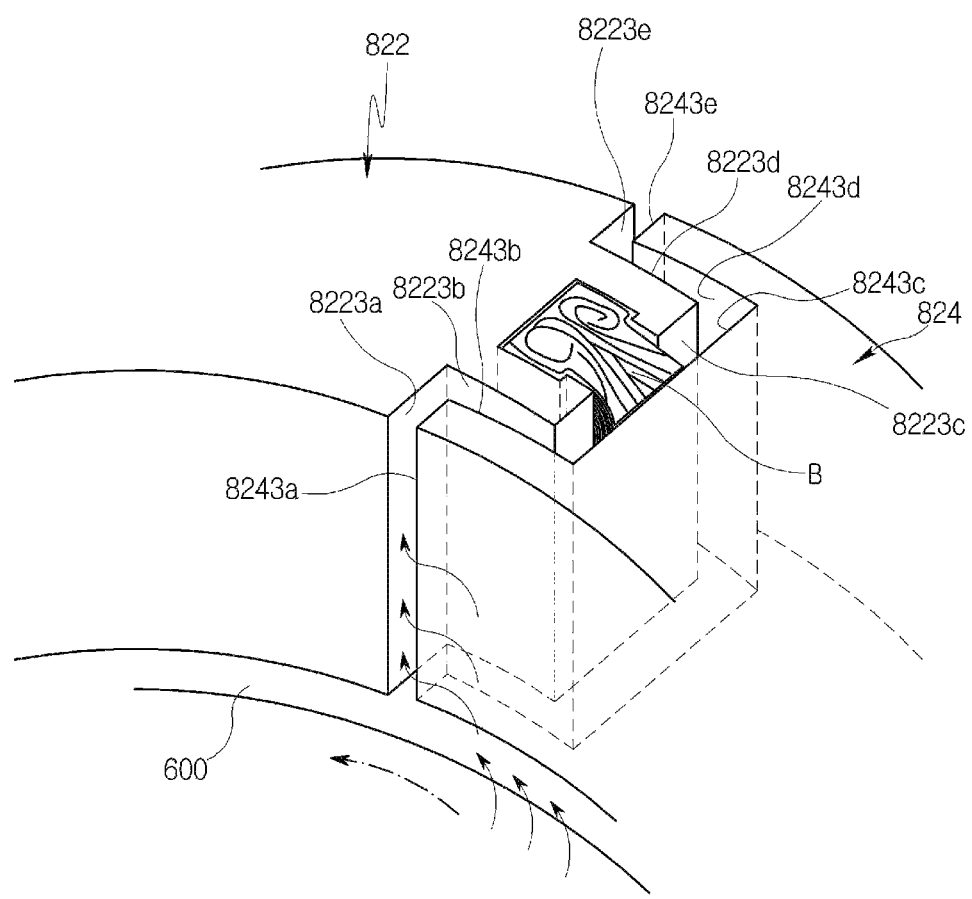

[FIG. 10]
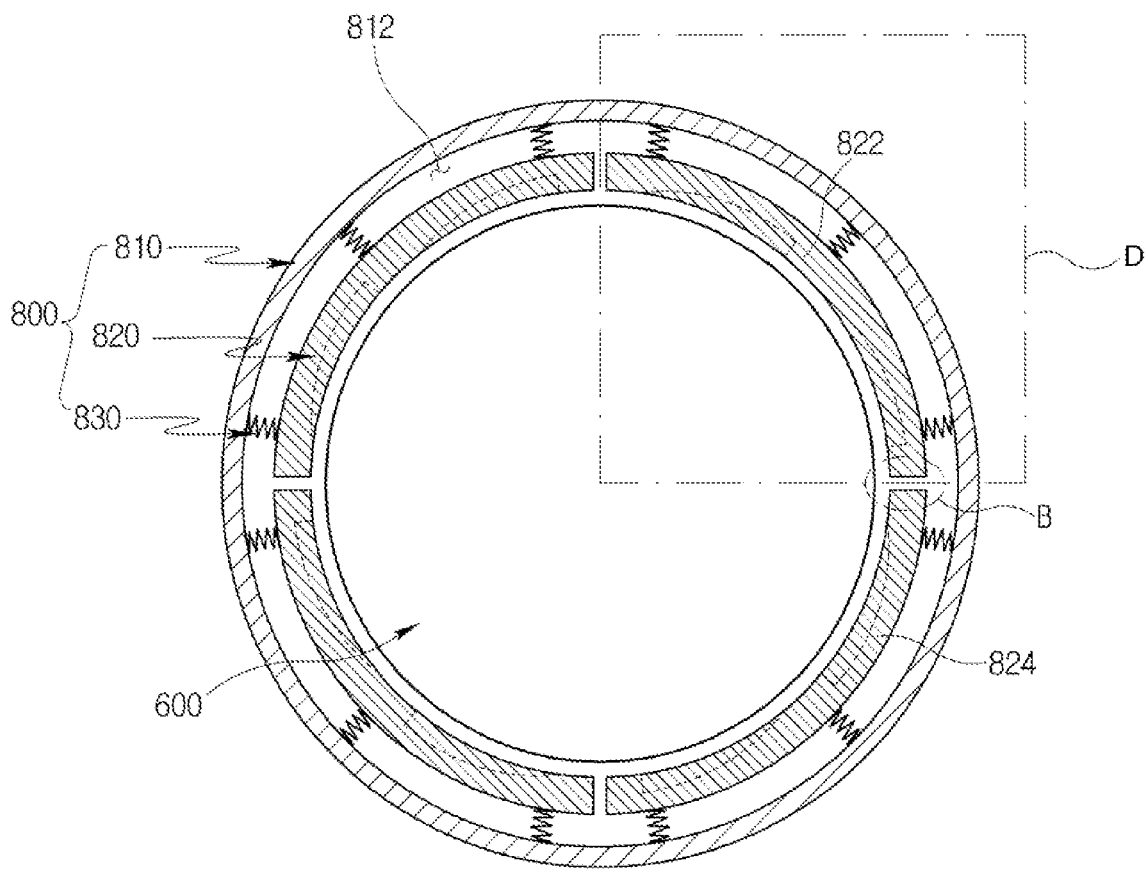

[FIG. 11]
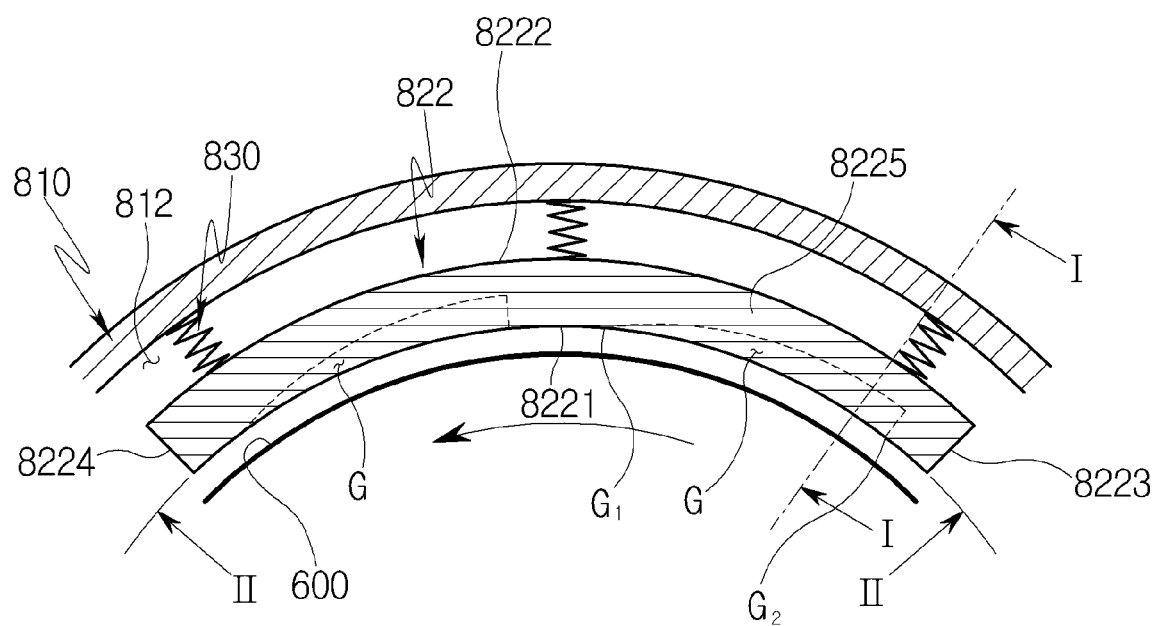

TURBINE APPARATUS

CROSS-REFERENCE TO RELATED APPLICATION

This is a continuation-in-part application of U.S. application Ser. No. 16/270,578 filed Feb. 7, 2019 now U.S. Pat. No. 11,162,378, which claims priority to Korean Patent Application No. 10-2018-0026867, filed on Mar. 7, 2018 the disclosure of which is incorporated herein by reference in its entirety.

BACKGROUND OF THE DISCLOSURE

1. Field of the Disclosure

The present disclosure relates generally to a turbine apparatus.

2. Description of the Background Art

Generally, a turbine apparatus is a machine that converts kinetic energy of a working fluid, such as water, gas, steam, etc., into mechanical work. Particularly, such a turbine apparatus generally includes a turbo-type machine in which a plurality of blades is installed on the periphery of a rotor so that steam or gas is directed onto the blades to create an impulse or reaction force is used to rotate the rotor at high speed.

Examples of such turbine apparatuses include a gas turbine that utilizes the energy of high-temperature and high-pressure gas, a steam turbine that utilizes the energy of steam, and the like.

The gas turbine includes a housing, a rotor rotatably installed in the housing, a compressor that receives rotational force from the rotor to compress air, a combustor that mixes fuel with air compressed in the compressor and ignites a fuel-air mixture to produce a combustion gas, and a turbine that rotates the rotor using the rotational force from the combustion gas generated in the combustor.

The steam turbine includes a housing, a rotor rotatably installed in the housing, a nozzle for spraying the steam, and a bucket provided to rotate the rotor using the rotational force from the steam sprayed from the nozzle.

Further, the turbine apparatuses include a sealing mechanism for preventing the working fluid from leaking between the housing and the rotor. For example, the gas turbine includes a sealing mechanism for preventing leakage of air between the housing and the rotor from the compressor side, and a sealing mechanism for preventing leakage of the combustion gas between the housing and the rotor from the turbine side. The steam turbine includes a sealing mechanism for preventing leakage of steam between the housing and the rotor.

SUMMARY OF THE DISCLOSURE

In conventional turbine apparatuses, there is a problem that degradation of operating efficiency and damage occur in the turbine apparatus due to the existence of the sealing mechanism, and a sealing function of the sealing mechanism itself deteriorates. Specifically, a conventional sealing mechanism for the turbine apparatus includes a so-called contacting seal in which a seal pad is always in contact with a rotor, or a so-called film riding pressure activated leaf seal in which the seal pad is separated from the rotor during the stop of the turbine apparatus, and the seal pad is moved towards the rotor, with a predetermined gap with the rotor, due to hydrostatic load during the operation of the turbine apparatus. In the case of the contacting seal, the seal pad is always in contact with the rotor, resulting in damage and reduction in efficiency due to friction. Further, in the case of the film riding pressure activated leaf seal, while the gap between the seal pad and the rotor is maintained at a predetermined level only in a part of the entire operation range, the gap is excessively increased in the rest of the operation range, resulting in reduction in a sealing function, or the seal pad is in contact with the rotor, resulting in damage and reduction in the efficiency due to friction.

Accordingly, the present disclosure has been made keeping in mind the above problems occurring in the related art, and an object of the present disclosure is to provide a turbine apparatus capable of preventing efficiency deterioration and damage caused by a sealing mechanism for preventing a working fluid from leaking between a housing and a rotor, and improving a sealing function of the sealing mechanism.

According to an aspect of the present disclosure, there is provided a turbine apparatus including: a stator; a rotor rotatably installed in the stator; a compressor receiving a rotational force from the rotor to compress air; a combustor mixing fuel with the air compressed in the compressor and igniting a fuel-air mixture to generate a combustion gas; a turbine rotating the rotor using a rotational force from the combustion gas generated in the combustor; and a sealing mechanism provided to prevent air or combustion gas from leaking between the stator and the rotor, wherein the sealing mechanism may include: a casing coupled to the stator and having a chamber opened toward the rotor; a seal pad accommodated in the chamber so as to be reciprocable in a rotationally radial direction of the rotor; and a spring applying an elastic force to the seal pad in a direction in which the seal pad approaches the rotor, wherein the seal pad may include an inner circumferential surface facing the rotor, and wherein the inner circumferential surface of the seal pad is provided with an engraved groove, wherein the sealing mechanism is brought into contact with the rotor when the rotor is stopped, and the sealing mechanism is spaced apart from the rotor by a predetermined gap under a hydrodynamic load generated in the groove when the rotor is rotated.

The groove may include a plurality of grooves, wherein the grooves are arranged along a rotation direction of the rotor.

The groove may be formed in a step of the same depth along the circumferential direction from one end part (G1) of the groove to the other end part (G2) of the groove in the seal pad.

The groove may be formed in a step of the different depth along the circumferential direction in the seal pad.

The step depth of the groove may increase from one end part (G1) of the groove to the other end part (G2) of the groove toward the inside of the seal pad based on the rotation direction of the rotor.

The spring may include a coil spring or a bump foil spring in which one side thereof is supported by the chamber and the other side thereof is supported by the seal pad. The spring may comprise a plurality of springs, wherein the springs are arranged along a rotation direction of the rotor.

The springs may be symmetrically formed with respect to a center of the seal pad in the rotation direction of the rotor.

The seal pad may include a plurality of seal pads, wherein the seal pads are arranged in an annular shape along a rotation direction of the rotor.

Assuming that any one of the seal pads is referred to as an n-th seal pad, and a seal pad next to the n-th seal pad of the seal pads is referred to as an (n+1)-th seal pad, the n-th seal pad is formed to be spaced from the (n+1)-th seal pad.

The n-th seal pad may include: an inner circumferential surface facing the rotor; an outer circumferential surface opposite to the inner circumferential surface; a first side facing the m-th seal pad; a second side opposite to the first side; a first front end surface bent from the inner circumferential surface, the outer circumferential surface, the first side, and the second side, and facing an upstream side of a working fluid; and a second front end surface opposite to the first front end surface, wherein the (n+1)-th seal pad may include: an inner circumferential surface facing the rotor; an outer circumferential surface opposite to the inner circumferential surface; a first side facing the n-th seal pad; a second side opposite to the first side; a first front end surface bent from the inner circumferential surface, the outer circumferential surface, the first side, and the second side, and facing an upstream side of a working fluid; and a second front end surface opposite to the first front end surface, wherein the first side of the n-th seal pad and the first side of the (n+1)-th seal pad are formed to be spaced from each other.

The first side of the n-th seal pad may include: a first part bent in the direction of a rotation axis of the rotor from the first front end surface; a second part bent in the rotation direction of the rotor from the first part; a third part bent in the rotation axis of the rotor from the second part; a fourth part bent in the rotation direction of the rotor from the third part and opposite to the second part; and a fifth part bent in the direction of the rotation axis of the rotor from the fourth part and connected to the second front end surface of the n-th seal pad, wherein the first side of the (n+1)-th seal pad may include: a first part bent in the direction of a rotation axis of the rotor from the first front end surface of the (n+1)-th seal pad and facing the first part of the first side of the n-th seal pad; a second part bent in the rotation direction of the rotor from the first part and facing the second part of the first side of the n-th seal pad; a third part bent in the rotation axis of the rotor from the second part and facing the third part of the first side of the n-th seal pad; a fourth part bent in the rotation direction of the rotor from the third part and facing the fourth part of the first side of the n-th seal pad; and a fifth part bent in the direction of the rotation axis of the rotor from the fourth part, connected to the second front end surface of the (n+1)-th seal pad, and facing the fifth part of the first side of the n-th seal pad.

One of the second part of the first side of the n-th seal pad and the second part of the first side of the (n+1)-th seal pad may be provided with at least one protrusion extending towards the other of the second parts, wherein one of the fourth part of the first side of the n-th seal pad and the fourth part of the first side of the (n+1)-th seal pad may be provided with at least one protrusion extending towards the other of the fourth parts.

At least one of the third part of the first side of the n-th seal pad and the third part of the first side of the (n+1)-th seal pad may be provided with a cavity to guide a working fluid from a position between the seal pad and the rotor to a position between the third part of the first side of n-th seal pad and the third part of the first side of the (n+1)-th seal pad.

One of the third part of the first side of the n-th seal pad and the third part of the first side of the (n+1)-th seal pad may be provided with a static brush to be brought into contact with the other of the third part of the first side of the n-th seal pad and the third part of the first side of the (n+1)-th seal pad.

The seal mechanism may further include an auxiliary seal pad provided to prevent a working fluid from leaking between the casing and the seal pad.

The casing may include a groove formed to be engraved from the chamber, wherein the auxiliary seal pad is inserted into the groove and is in contact with the seal pad.

The auxiliary seal pad may be formed in a circular shape in cross section perpendicular to the rotation direction of the rotor.

In accordance with another embodiment, there is provided a turbine apparatus including: a stator; a rotor rotatably installed in the stator; a nozzle spraying steam; a bucket rotating the rotor using a rotational force from the steam injected from the nozzle; a sealing mechanism provided to prevent air or combustion gas from leaking between the stator and the rotor, wherein the sealing mechanism may include: a casing coupled to the stator and having a chamber opened toward the rotor; a seal pad accommodated in the chamber so as to be reciprocable in a rotationally radial direction of the rotor; and a spring applying an elastic force to the seal pad in a direction in which the seal pad approaches the rotor, wherein the seal pad may include an inner circumferential surface facing the rotor, and wherein the inner circumferential surface of the seal pad is provided with an engraved groove, wherein the sealing mechanism is brought into contact with the rotor when the rotor is stopped, and the sealing mechanism is spaced apart from the rotor by a predetermined gap under a hydrodynamic load generated in the groove when the rotor is rotated.

BRIEF DESCRIPTION OF THE DRAWINGS

FIG. 1 is a cross-sectional view of a turbine apparatus according to an embodiment of the present disclosure;

FIG. 2 is a cross-sectional view of a portion of the turbine apparatus shown in FIG. 1 where a sealing mechanism is provided, in a direction perpendicular to a rotary axis of the rotor;

FIG. 3 is an enlarged view of a portion A in FIG. 2;

FIG. 4 is a cross-sectional view taken along the line I-I in FIG. 3;

FIG. 5 is a cross-sectional view taken along the line II-II in FIG. 3;

FIG. 6 is a perspective view showing a portion B in FIG. 2;

FIG. 7 is a plan view of FIG. 6;

FIG. 8 is a cross-sectional view illustrating a portion of a turbine apparatus where a sealing mechanism is provided, in a direction perpendicular to a rotary axis of the rotor, according to another embodiment of the present disclosure; and FIG. 9 is a perspective view showing a portion C of FIG. 8.

FIG. 10 is a cross-sectional view of a portion of the turbine apparatus shown in FIG. 1, where another embodiment of a sealing mechanism is provided, in a direction perpendicular to a rotary axis of the rotor;

FIG. 11 is an enlarged view of a portion D in FIG. 10.

DETAILED DESCRIPTION OF THE DISCLOSURE

Hereinafter, exemplary embodiments of the present disclosure will be described in detail with reference to the accompanying drawings.

FIG. 1 is a cross-sectional view of a turbine apparatus according to an embodiment of the present disclosure. FIG.

2 is a cross-sectional view of a portion of the turbine apparatus shown in FIG. 1, where a sealing mechanism is provided in a direction perpendicular to a rotary axis of the rotor. FIG. 3 is an enlarged view of a portion A in FIG. 2. FIG. 4 is a cross-sectional view taken along the line I-I in FIG. 3. FIG. 5 is a cross-sectional view taken along the line II-II in FIG. 3. FIG. 6 is a perspective view showing a portion B in FIG. 2, and FIG. 7 is a plan view of FIG. 6.

Referring to FIG. 1, the turbine apparatus according to an embodiment of the present disclosure includes a housing 100, a rotor section 600 rotatably installed in the housing 100, a compressor section 200 that receives a rotating force from the rotor section 600 to compress the air introduced into the housing 100, a combustor section 400 that mixes the fuel with the air compressed by the compressor section 200 and ignites a fuel-air mixture to generate a combustion gas, a turbine section 500 that rotates the rotor section 600 by receiving a rotational force from the combustion gas generated from the combustor section 400, a generator 700 that operates in association with the rotor section 600 for generating electricity, and a diffuser through which the combustion gas passed through the turbine section 500 is discharged.

The housing 100 includes a compressor housing 110 in which the compressor section 200 is accommodated, a combustor housing 120 in which the combustor section 400 is accommodated, and a turbine housing 130 in which the turbine section 500 is accommodated.

Here, the compressor housing 110, the combustor housing 120, and the turbine housing 130 may be sequentially arranged from the upstream side to the downstream side in a flow direction of fluid.

The rotor section 600 includes a compressor disk 610 accommodated by the compressor housing 110, a turbine disk 630 accommodated by the turbine housing 130, a torque tube 620 accommodated by the combustor housing 120 to connect the compressor disk 610 and the turbine disk 630, and a tie rod 640 and a fastening nut 650 coupling the compressor disk 610, the torque tube 620 and the turbine disk 630.

The compressor disk 610 may comprise a plurality of compressor disks which is arranged along an axial direction of the rotor section 600. That is, the compressor disks 610 may be formed in multiple stages.

Each of the compressor disks 610 may be formed in a substantially disk shape, a periphery of which is provided with a compressor disk slot into which a compressor blade 210, which will be described later, may be fitted.

The compressor disk slot may be formed in the form of a fir-tree to prevent the compressor blade 210 to be described later from being detached from the compressor disk slot in the radial direction of rotation of the rotor section 600.

Here, the compressor disk 610 and the compressor blade 210 are typically coupled in a tangential type or an axial type. In this embodiment, the compressor disk 610 and the compressor blade 210 are formed to be coupled in an axial type. Accordingly, the compressor disk slot may comprise a plurality of compressor disk slots, which may be radially arranged along the circumferential direction of the compressor disk 610.

The turbine disk 630 may be formed similar to the compressor disk 610. That is, the turbine disk 630 may comprise a plurality of turbine disks, which may be arranged along the axial direction of the rotor section 600. That is, the turbine disks 630 may be formed in multiple stages.

Each of the turbine disks 630 is formed in a substantially disk shape, a periphery of which is provided with a turbine disk slot into which a turbine blade 510, which will be described later, may be fitted.

The turbine disk slot may be formed in the form of a fir-tree to prevent the turbine blade 510 to be described later from being detached from the turbine disk slot in the radial direction of rotation of the rotor section 600.

Here, the turbine disk 630 and the turbine blade 510 are typically coupled in a tangential type or an axial type. In this embodiment, the turbine disk 630 and the turbine blade 510 are formed to be coupled in an axial type. Accordingly, the turbine disk slot may comprise a plurality of turbine disk slots, which may be radially arranged along the circumferential direction of the turbine disk 630.

The torque tube 620 is a torque transmission member for transmitting the rotational force of the turbine disk 630 to the compressor disk 610. The torque tube 620 may have one end coupled to a most downstream one of the compressor disks 610 in a flow direction of air, and the other end coupled to a most upstream one of the turbine disks 630 in a flow direction of a combustion gas. Here, both ends of the torque tube 620 have a protrusion P. Grooves for engaging with the protrusions P are respectively formed in the compressor disk 610 and the turbine disk 630 to prevent relative rotation of the torque tube 620 with respect to the compressor disk 610 and the turbine disk 630.

The torque tube 620 may be formed in the shape of a hollow cylinder so that the air supplied from the compressor section 200 may flow through the torque tube 620 to the turbine section 500.

The torque tube 620 may be resistant against deformation and distortion as the turbine apparatus is continuously operated for a long period of time, and it may be easily assembled and disassembled for maintenance.

The tie rod 640 is formed to pass through the plurality of compressor disks 610, the torque tube 620 and the plurality of turbine disks 630, and has one end, which is fastened in the compressor disk 610 located at the most upstream end in the flow direction of air and the other end, which protrudes opposite to the compressor section 200 with respect to the turbine disk 630 located at the most downstream end in the flow direction of the combustion gas, and is engaged with the fastening nut 650.

Here, the fastening nut 650 tightens the most downward turbine disk 630 towards the compressor section 200 so that the distance between the most upstream compressor disk 610 and the most downstream turbine disk 630 is gradually reduced, thereby compressing the compressor disks 610, the torque tube 620, and the turbine disks 630 in the axial direction of the rotor section 600. Accordingly, axial movement and relative rotation of the plurality of compressor disks 610, the torque tube 620, and the plurality of turbine disks 630 can be prevented.

Meanwhile, although in the present embodiment, a single tie-rod 640 is formed to pass through the center of the plurality of compressor disks 610, the torque tube 620, and the plurality of the turbine disks 630, the present disclosure is not limited thereto. That is, respective separate tie rods 640 may be provided on the compressor section 200 and the turbine section 500, a plurality of tie rods 640 may be disposed radially along the circumferential direction, or a combination of these configuration may also be possible.

In the rotor section 600, both ends may be rotatably supported by bearings such that one of the ends is connected to a drive shaft of the generator 700.

The compressor section 200 may include the compressor blade 210 rotated along with the rotor section 600 and a compressor vane 220 fixed to the housing 100 to align the flow of air flowing into the compressor blade 210.

The compressor blade 210 may comprise a plurality of compressor blades, which may be formed in multiple stages along the axial direction of the rotor section 600, wherein the compressor blades 210 may be arranged radially along the rotation direction of the rotor section 600 for respective stages.

Each of the compressor blades 210 may include a plate-shaped platform portion, a root portion extending from the platform portion toward the centripetal side in the radial direction of rotation of the rotor section 600, and an airfoil portion extending from the platform portion toward the centrifugal side in the radial direction of rotation of the rotor section 600.

The platform portion may be in contact with a neighboring platform portion, and may serve to maintain a gap between the airfoil portions.

The root portion may be formed in a so-called axial type in which the root portion is inserted into the compressor disk slot along the axial direction of the rotor section 600 as described above.

The root portion may be formed in a fir-tree shape corresponding to the compressor disk slot.

In this embodiment, the root portion and the compressor disk slot are formed in the form of a fir tree, but the present disclosure is not limited thereto, and may be formed in a dovetail shape or the like. Alternatively, the compressor blade 210 may be fastened to the compressor disk 610 by using fasteners other than the above-described fastening shapes, such as keys or bolts.

The compressor disk slot may be formed larger than the root portion so as to form a gap with the root portion such that the root portion and the compressor disk slot are easily engaged with each other.

Although not separately shown, the root portion and the compressor disk slot are fixed by separate fins so that the root portion is prevented from being detached in the axial direction of the rotor section 600 from the compressor disk slot.

The airfoil portion may be configured to have an airfoil optimized according to the specification of the turbine apparatus, and may include a leading edge which is positioned upstream of the flow direction of air and onto which the air is introduced, and a trailing edge which is positioned downstream of the flow direction of air and from which the air flows out.

The compressor vane 220 may comprise a plurality of compressor vanes, which may be formed in a plurality of stages along the axial direction of the rotor section 600. Here, the compressor vanes 220 and the compressor blades 210 may be alternately arranged along the flow direction of air.

The plurality of compressor vanes 220 may be radially formed at each stage along the rotational direction of the rotor section 600.

Each of the compressor vanes 220 includes a platform portion formed in an annular shape along the rotating direction of the rotor section 600, and an airfoil portion extending from the platform portion in the radial direction of rotation of the rotor section 600.

The platform portion includes a root side platform part proximal to the airfoil portion of the compressor vane and fastened to the compressor housing 110 and a tip side platform part distal to the airfoil portion opposite to the rotor section 600.

Here, although the platform portion of the compressor vane according to the present embodiment includes the root side and tip side platform parts for more stably supporting the airfoil portion of the compressor vane by supporting both the proximal and distal sides of the airfoil portion, the present disclosure is not limited thereto. For example, the compressor vane platform portion may be formed to include only the root side platform portion to support only the proximal side of the compressor vane airfoil portion.

Each of the compressor vanes 220 may further include a root portion of the compressor vane for coupling the root side platform portion and the compressor housing 110.

The airfoil portion of the compressor vane may be configured to have an airfoil optimized according to the specification of the turbine apparatus, and may include a leading edge which is positioned upstream of the flow direction of air and onto which the air is introduced, and a trailing edge which is positioned downstream of the flow direction of air and from which the air flows out.

The combustor section 400 mixes the air introduced from the compressor section 200 with fuel and combusts a fuel-air mixture to produce a high-temperature and high-pressure combustion gas. The combustor section may be formed to increase the temperature of the combustion gas up to the heat resistance limit that the combustor section 400 and the turbine section 500 are able to withstand during an isobaric combustion process.

Specifically, the combustor section 400 may comprise a plurality of combustor sections, which may be arranged along the rotational direction of the rotor section 600 in the combustor housing 120.

Each of the combustor sections 400 includes a liner into which air compressed in the compressor section 200 flows, a burner that injects fuel into the air flowing into the liner and combusts the fuel-air mixture, and a transition piece through which a combustion gas generated in the burner is guided to the turbine section 500.

The liner may include a flame chamber constituting a combustion chamber, and a flow sleeve that surrounds the flame chamber to form an annular space.

The burner may include a fuel injection nozzle formed at a front-end side of the liner so as to inject fuel into the air flowing into the combustion chamber and an ignition plug formed on a wall portion of the liner so that fuel-air mixture mixed in the combustion chamber is ignited.

The transition piece may be formed so that an outer wall thereof is cooled by the air supplied from the compressor section 200 so as to prevent the transition piece from being damaged by the high temperature combustion gas.

That is, the transition piece may be provided with a cooling hole through which air is injected into the transition piece to cool the same.

The air that has cooled the transition piece flows into the annular space of the liner, and air is supplied, as a cooling air, towards and collides with the outer wall of the liner from the outside of the flow sleeve through the cooling holes provided in the flow sleeve.

Here, although not shown in the drawings, a deswirler serving as a guide may be disposed between the compressor section 200 and the combustor section 400 to adjust a flow angle of the air flowing into the combustor section 400 to a designed flow angle.

The turbine section 500 may be formed similarly to the compressor section 200.

That is, the turbine section 500 includes the turbine blade 510 rotated together with the rotor section 600, and a turbine vane 520 fixed to the housing 100 to align a flow of air flowing into the turbine blade 510.

The turbine blade 520 may comprise a plurality of the turbine blades, which may be arranged in a plurality of stages along the axial direction of the rotor section 600, and the turbine blades 510 may be formed in each stage radially along the rotation direction of the rotor section 600.

Each of the turbine blades 510 may include a plate-shaped platform portion, a root portion extending from the platform portion toward the centripetal side in the radial direction of rotation of the rotor section 600, and an airfoil portion extending from the platform portion toward the centrifugal side in the radial direction of rotation of the rotor section 600.

The platform portion of the turbine blade may be in contact with a neighboring platform portion, and may serve to maintain a gap between the airfoil portions.

The root portion may be formed in a so-called axial type in which the root portion is inserted into the turbine disk slot along the axial direction of the rotor section 600 as described above.

The root portion of the turbine blade may be formed in a fir-tree shape corresponding to the turbine disk slot.

In this embodiment, the root portion and the turbine disk slot are formed in the form of a fir tree, but the present disclosure is not limited thereto, and may be formed in a dovetail shape or the like. Alternatively, the turbine blade 510 may be fastened to the turbine disk 630 by using fasteners other than the above-described fastening shapes, such as keys or bolts.

The turbine disk slot may be formed larger than the root portion of the turbine blade so as to form a gap with the root portion such that the root portion and the turbine disk slot are easily engaged with each other.

Although not separately shown, the root portion and the turbine disk slot are fixed by separate fins so that the root portion is prevented from being detached in the axial direction of the rotor section 600 from the turbine disk slot.

The airfoil portion of the turbine blade may be configured to have an airfoil optimized according to the specification of a turbine apparatus, and may include a leading edge which is positioned upstream of the flow direction of a combustion gas and onto which the combustion gas is introduced, and a trailing edge which is positioned downstream of the flow direction of the combustion gas and from which the combustion gas flows out.

The turbine vane 520 may comprise a plurality of turbine vanes, which may be formed in a plurality of stages along the axial direction of the rotor section 600. Here, the turbine vanes 520 and the turbine blades 510 may be alternately arranged along the flow direction of air.

The plurality of turbine vanes 520 may be radially formed at each stage along the rotational direction of the rotor section 600.

Each of the turbine vanes 520 includes a platform portion formed in an annular shape along the rotating direction of the rotor section 600, and an airfoil portion extending from the platform portion in the radial direction of rotation of the rotor section 600.

The platform portion of the turbine vane 520 includes a root side platform part proximal to the airfoil portion of the turbine vane and fastened to the turbine housing 130 and a tip side platform part distal to the airfoil portion of the turbine vane opposite to the rotor section 600.

Here, although the platform portion of the turbine vane 520 according to the present embodiment includes the root side and tip side platform parts for more stably supporting the airfoil portion of the turbine vane by supporting both the proximal and distal sides of the airfoil portion of the turbine vane, the present disclosure is not limited thereto. That is, the turbine vane platform portion may be formed to include only the root side platform portion to support only the proximal side of the turbine vane airfoil portion.

Each of the turbine vanes 520 may further include a root portion of the turbine vane for coupling the root side platform portion and the turbine housing 130.

The airfoil portion of the turbine vane may be configured to have an airfoil optimized according to the specification of the turbine apparatus, and may include a leading edge which is positioned upstream of the flow direction of a combustion gas and onto which the combustion gas is introduced, and a trailing edge which is positioned downstream of the flow direction of the combustion gas and from which the combustion gas flows out.

Here, unlike the compressor section 200, the turbine section 500 is in contact with a combustion gas at a high temperature and a high pressure, so that the turbine section may require a cooling means for preventing damage such as deterioration.

To this end, the turbine apparatus according to the present embodiment further includes a cooling path through which compressed air is additionally supplied from a portion of the compressor section 200 to the turbine section 500. The air in the cooling path will be hereinafter referred to as a cooling fluid.

The cooling path may have an external path (which extends outside the housing 100), an internal path (which extends through the interior of the rotor section 600), or both the external path and the internal path.

The cooling path communicates with a cooling path formed in the turbine blade 510, so that the turbine blade 510 can be cooled by the cooling fluid (e.g., air).

In addition, similar to the turbine blade 510, the turbine vane 520 may be formed to be cooled by receiving a cooling fluid (e.g., air) from the cooling path.

In the turbine apparatus according to this configuration, the air introduced into the housing 100 is compressed by the compressor section 200, and the air compressed by the compressor section 200 is mixed with the fuel by the combustor section 400 to generate a fuel-air mixture. The fuel-air mixture is combusted by the combustor section to produce a combustion gas, which is then introduced into the turbine section 500 through the turbine blades 510 to rotate the rotor section 600, and is discharged to the atmosphere through the diffuser. The rotor 600, which is rotated by the combustion gas, can drive the compressor section 200 and the generator 700. That is, a portion of the mechanical energy obtained from the turbine section 500 may be supplied to the compressor section 200 as energy required to compress the air, and the remainder may be used to generate electric power using the generator 700.

Meanwhile, the turbine apparatus according to the present embodiment requires a gap between the rotor 600 and a stator (for example, the housing 100) so that the rotor 600 may rotate smoothly.

However, as the gap increases, it is advantageous in terms of prevention of interference between the rotor 600 and the stator, but it is disadvantageous in terms of leakage of working fluid (e.g., air in the case of the compressor 200 side, and combustion gas in the case of the turbine 500 side). As the gap decreases, the effect becomes opposite. That is, the wider the gap is, a flow of leakage increases to reduce the efficiency of turbine apparatus, but the interference and damage between the rotor 600 and the stator may be prevented. On the other hand, as the gap decreases, a flow of leakage is reduced to improve the efficiency of the turbine apparatus, but the interference and damage between the rotor 600 and the stator may occur.

Accordingly, as shown in FIGS. 2 to 7, the turbine apparatus according to the present embodiment may further include a sealing mechanism 800 having a proper gap between the rotor 600 and the stator to prevent a leakage of working fluid between the rotor 600 and the stator. As a result, the reduction in the efficiency of the turbine apparatus may be minimized while preventing the interference and damage between the rotor 600 and the stator.

Referring to FIGS. 2 to 7, the sealing mechanism 800 may be operated such that when the rotor 600 is stopped, the sealing mechanism is in contact with the rotor 600 by the elastic force of a spring 830, and when the rotor 600 is rotating, the sealing mechanism is lifted and spaced from the rotor 600 by a predetermined gap by a hydrodynamic load generated by a groove G.

Specifically, the sealing mechanism 800 includes a casing 810 coupled to the housing 100 and a chamber 812 opened toward the rotor 600, a seal pad 820 accommodated in the chamber 812, and the spring 830 for applying an elastic force to the seal pad 820 in a direction in which the seal pad 820 approaches the rotor 600.

The casing 810 may be formed in an annular shape extending along the rotating direction of the rotor 600 from the centrifugal side in the radial direction of the rotor 600 with respect to the rotor 600.

The casing 810 may be fixed to the stator at an outer peripheral portion thereof.

The chamber 812 of the casing 810 may be formed on an inner peripheral surface of the casing.

The chamber 812 may be formed in an annular shape that is engraved toward the centrifugal side in the radial direction of the rotor 600 from the inner peripheral surface of the casing 810 and is concentrical with the casing 810.

The seal pad 820 consists of a plurality of seal pads which surrounds an outer peripheral surface of the rotor 600 such that the seal pads reciprocate in the radial direction of the rotor 600, and are arranged in an annular form in the rotation direction of the rotor 600. That is, each of the seal pads 820 is formed in an arc shape, and the arc-shaped seal pads 820 which are separated from each other are arranged along the rotation direction of the rotor 600 to form a single ring that surrounds the rotor 600.

Here, since the seal pads 820 are formed to be spaced apart from each other, the leakage of a working fluid may occur through gaps between the seal pads 820. Therefore, means for preventing the leakage of the working fluid may be provided between the seal pads 820.

Specifically, assuming that any one of the seal pads 820 is referred to as an n-th seal pad 822, the n-th seal pad 822 includes an inner circumferential surface 8221 facing the rotor 600; an outer circumferential surface 8222 opposite to the inner circumferential surface 8221; a first side 8223 facing a seal pad 824 (e.g. an m-th seal pad) next to the n-th seal pad 822; a second side 8224 opposite to the first side 8223; a first front end surface 8225 bent from the inner circumferential surface 8221, the outer circumferential surface 8222, the first side 8223, and the second side 8224, and facing an upstream side of a working fluid, and a second front end surface 8226 opposite to the first front end surface 8225.

Further, assuming that a seal pad next to the n-th seal pad 822 of the seal pads 820 is referred to as an m-th seal pad 824, the m-th seal pad 824 includes an inner circumferential surface 8241 facing the rotor 600; an outer circumferential surface 8242 opposite to the inner circumferential surface 8241; a first side 8243 facing the n-th seal pad 822; a second side 8244 opposite to the first side 8243; a first front end surface 8245 bent from the inner circumferential surface 8241, the outer circumferential surface 8242, the first side 8243, and the second side 8244, and facing an upstream side of a working fluid, and a second front end surface 8246 opposite to the first front end surface 8245.

Here, the first side 8223 of the n-th seal pad and the first side 8243 of the m-th seal pad may be separated from each other such that the n-th seal pad 822 and the m-th seal pad 824 can respectively reciprocate in the radial direction of rotation of the rotor 600.

Here, since the first side 8223 of the n-th seal pad and the first side 8243 of the m-th seal pad may be separated from each other so that a working fluid leaks between the first side 8223 of the n-th seal pad and the first side 8243 of the m-th seal pad, thereby reducing the efficiency of the turbine apparatus, it may be desirable to have a labyrinth seal to prevent leakage of the working fluid between the first side 8223 and the first side 8243.

That is, the first side 8223 of the n-th seal pad includes a first part 8223a bent in the direction of a rotation axis of the rotor 600 from the first front end surface 8225, a second part 8223b bent in the rotation direction of the rotor 600 from the first part 8223a, a third part 8223c bent in the rotation axis of the rotor 600 from the second part 8223b, a fourth part 8223d bent in the rotation direction of the rotor 600 from the third part 8223c and opposite to the second part 8223b, and a fifth part 8223e bent in the direction of the rotation axis of the rotor 600 from the fourth part 8223d and connected to the second front end surface 8226 of the n-th seal pad.

Further, the first side 8243 of the m-th seal pad includes a first part 8243a bent in the direction of a rotation axis of the rotor 600 from the first front end surface 8245 of the m-th seal pad and facing the first part 8223a of the first side of the n-th seal pad, a second part 8243b bent in the rotation direction of the rotor 600 from the first part 8243a and facing the second part 8223b of the first side of the n-th seal pad, a third part 8243c bent in the rotation axis of the rotor 600 from the second part 8243b and facing the third part 8223c of the first side of the n-th seal pad, a fourth part 8243d bent in the rotation direction of the rotor 600 from the third part 8243c and facing the fourth part 8223d of the first side of the n-th seal pad, and a fifth part 8243e bent in the direction of the rotation axis of the rotor 600 from the fourth part 8243d, connected to the second front end surface 8246 of the m-th seal pad, and facing the fifth part 8223e of the first side of the n-th seal pad.

In order to more effectively prevent leakage between the first side 8223 of the n-th seal pad and the first side 8243 of the m-th seal pad, it is preferred that the third part 8223c of the first side of the n-th seal pad is provided with a cavity C to guide a working fluid from a position between the seal pad 820 and the rotor 600 to a position between the third part 8223c of the first side of n-th seal pad and the third part 8243c of the first side of the m-th seal pad to form a fluid curtain of the working fluid discharged from the cavity C.

Here, while the cavity C is formed in the third part 8223c of the first side of the n-th seal pad in the present embodiment, the cavity C may be formed in the third part 8243c of the first side of the m-th seal pad.

Further, it may be further preferred that protrusions P are formed on both sides of the cavity C to reduce a sectional area of a flow path, thereby allowing a fluid curtain formed by the cavity C to have a further excellent sealing effect.

That is, in order to reduce a pressure of a working fluid introduced between the first side 8223 of the n-th seal pad and the first side 8243 of the m-th seal pad and the first front end surface 8225 of the n-th seal pad and the first front end surface 8245 of the m-th seal pad, one of the second part 8223b of the first side of the n-th seal pad and the second part 8243b of the first side of the m-th seal pad may be provided with at least one protrusion P extending towards the other of the second parts 8223b and 8243b. Here, the at least one protrusion P may be formed between the first part 8223b of the first side of the n-th seal pad and the first part 8243b of the first side of the m-th seal pad. Alternatively, since it is further advantageous that the working fluid collides against the second part 8223b of the first side of the n-th seal pad before being introduced into the at least one protrusion P for reducing the pressure of the working fluid, the at least one protrusion P may preferably be formed between the second part 8223b of the first side of the n-th seal pad and the second part 8243b of the first side of the m-th seal pad.

Similarly, one of the fourth part 8223d of the first side of the n-th seal pad and the fourth part 8243d of the first side of the m-th seal pad may be provided with at least one protrusion P extending towards the other of the fourth parts 8223d and 8243d.

In the meantime, the seal pad 820 may be provided in the inner circumferential surface thereof with an engraved groove G so as to generate a hydrodynamic load when the rotor 600 rotates. That is, the engraved grooves G may be formed in the inner circumferential surfaces 8221 and 8241 of the n-th seal pad and the m-th seal pad.

Although the grooves G are formed in a hemispherical shape in this embodiment, the grooves may have other shape so long as they generate an optimized hydrodynamic load according to specifications of a turbine apparatus.

The grooves G are formed symmetrically with respect to the center of the seal pad 820 along the rotational direction of the rotor 600 so that the hydrodynamic load acts evenly on the entire inner circumferential surface of the seal pad 820.

That is, a plurality of grooves G are formed in the inner circumferential surface 8221 of the n-th seal pad such that the grooves G formed in the inner circumferential surface 8221 are arranged in the rotational direction of the rotor 600 within a range of the inner circumferential surface 8221, wherein the grooves G may be symmetrically formed with respect to the center of the n-th seal pad 822 in the rotation direction of the rotor 600.

Further, the grooves G formed in the inner circumferential surface 8241 of m-th seal pad are formed in the same number as the grooves G formed in the inner circumferential surface 8221 of the n-th seal pad, such that the grooves G formed in the inner circumferential surface 8241 are arranged in the rotational direction of the rotor 600 within a range of the inner circumferential surface 8241, wherein the grooves G may be symmetrically formed with respect to the center of the m-th seal pad 824 in the rotation direction of the rotor 600.

The spring 830 may be a coil spring having one side supported by the chamber 812 and the other side supported by the seal pad 820.

The spring 830 may comprise a plurality of springs 830 so that an elastic force can be evenly applied to the seal pad 820. The springs 830 may be arranged in the rotation direction of the rotor 600 such that the springs are formed symmetrically with respect to the center of the seal pad 820.

That is, the plurality of springs 830 is formed on the outer circumferential surface 8222 of the n-th seal pad such that the springs 830 formed on the outer circumferential surface 8222 are arranged in the rotational direction of the rotor 600 within a range of the outer circumferential surface 8222, wherein the springs 830 may be symmetrically formed with respect to the center of the n-th seal pad 822 in the rotation direction of the rotor 600.

Further, the springs 830 formed on the outer circumferential surface 8242 of the m-th seal pad have the same number as the springs 830 formed on the outer circumferential surface 8222 of the n-th seal pad such that the springs 830 formed on the outer circumferential surface 8242 are arranged in the rotational direction of the rotor 600 within a range of the outer circumferential surface 8242, wherein the springs 830 may be symmetrically formed with respect to the center of the m-th seal pad 842 in the rotation direction of the rotor 600.

The seal mechanism 800 according to this configuration may be configured such that when the rotor 600 is stopped, the seal pad 820 is pressed toward and brought into contact with the rotor 600 by the elastic force of the spring 830.

Further, when the rotor 600 is rotated, the seal pad 820 is lifted and separated from the rotor 600 by the hydrodynamic load generated in the grooves G. Here, the seal pad 820 may be kept spaced apart by a predetermined gap from the rotor 600 over the entire operation range by a hydrodynamic load acting on the centrifugal side in the rotationally radial direction of the rotor 600 and an elastic force acting on the centripetal side in the rotationally radial direction of the rotor 600. Thus, friction between the seal pad 820 and the rotor 600 is prevented over the entire operation range, and leakage of a working fluid between the rotor 600 and the stator can be prevented. Thus, damage and reduction in the efficiency by the sealing mechanism 800 can be prevented, and a sealing function of the sealing mechanism 800 can be improved.

As described above, since the seal pad 820 is formed to be able to reciprocate within the casing 810 (more precisely, the chamber 812), there is a gap between the casing 810 and the seal pad 820, through which a working fluid leaks, thereby reducing the efficiency of the turbine apparatus. In order to prevent this, in the case of this embodiment, an auxiliary seal pad 840 may be further provided for preventing a working fluid from leaking between the casing 810 and the seal pad 820.

However, it is preferred that the auxiliary seal pad 840 is formed to minimize friction with the seal pad 820 without disturbing the reciprocating motion of the seal pad 820. To this end, in this embodiment, the casing 810 may have a groove 814 engraved from the chamber 812 such that the auxiliary seal pad 840 is inserted into the groove 814, and comes into contact with the seal pad 820. Further, the auxiliary seal pad 840 may have a circular shape in cross section perpendicular to the rotational direction of the rotor 600 to minimize a contact area.

Meanwhile, while the present embodiment illustrates that the spring 830 is formed as a compression coil spring, the present disclosure is not limited thereto. That is, for example, as shown in FIG. 8, the spring may be formed as a bump foil spring.

While the present embodiment illustrates that the cavity C and the at least one protrusion P are provided between the seal pads 820 to prevent leakage between the seal pads 820, the present disclosure is not limited thereto. That is, for example, as shown in FIG. 9, the casing and the protrusion may be replaced with a static brush B. In other words, one of the third part 8223c of the first side of the n-th seal pad and the third part 8243c of the first side of the m-th seal pad may be provided with the static brush B contacting the other one of the third parts 8223c and 8243c.

Meanwhile, while the present embodiment illustrated the turbine apparatus is formed as a so-called gas turbine, the present disclosure is not limited thereto. For example, the turbine apparatus may be a steam turbine. That is, although not shown separately, the turbine apparatus may include a stator, a rotor rotatably installed in the stator, a nozzle for spraying steam, a bucket for rotating the rotor using a rotational force from the steam injected from the nozzle, and a sealing mechanism 800 for preventing the combustion gas from leaking between the stator and the rotor.

While the exemplary embodiments of the present disclosure have been described in the detailed description, the present disclosure is not limited thereto, but should be construed as including all of modifications, equivalents, and substitutions falling within the spirit and scope of the disclosure defined by the appended claims.

Referring to FIGS. 10 and 11, another embodiment of the sealing mechanism 800 is disclosed.

The groove G, as shown in FIGS. 2 and 3, formed in the seal pad 820 is formed a step of the same depth along the circumferential direction from one end part G1 of the groove G to the other end part G2 of the groove G.

The shape of the groove G is that the groove G is induced to develop a hydrodynamic load by giving only a step of the same depth.

On the other hand, the groove G, as shown in FIGS. 10 and 11, formed in the seal pad 820 is formed a step of the different depth along the circumferential direction.

In particular, the groove G is formed such that the step depth increases toward the inside of the seal pad 820 from one end part G1 of the groove G to the other end part G2 of the groove G based on the rotation direction of the rotor 600. That is, the groove G is formed in an inclined shape in which the step difference of the groove G gradually deepens in the rotation direction of the rotor 600, thereby inducing the hydrodynamic load to develop better.

The invention claimed is:

1. A turbine apparatus comprising:
   a stator;
   a rotor rotatably installed in the stator;
   a compressor receiving a rotational force from the rotor to compress air;
   a combustor mixing fuel with the air compressed in the compressor and igniting a fuel-air mixture to generate a combustion gas;
   a turbine rotating the rotor using a rotational force from the combustion gas generated in the combustor; and
   a sealing mechanism provided to prevent air or combustion gas from leaking between the stator and the rotor,
   wherein the sealing mechanism includes:
   a casing coupled to the stator and having a chamber opened toward the rotor;
   a seal pad accommodated in the chamber so as to be reciprocable in a rotationally radial direction of the rotor; and
   a spring applying an elastic force to the seal pad in a direction in which the seal pad approaches the rotor,
   wherein the seal pad includes an inner circumferential surface facing the rotor, and wherein the inner circumferential surface of the seal pad is provided with an engraved groove, the engraved groove configured to induce a hydrodynamic load, upon rotation of the rotor, in a direction of lifting the seal pad away from the rotor,
   wherein the sealing mechanism is brought into contact with the rotor when the rotor is stopped, and the sealing mechanism is lifted and spaced apart from the rotor by a predetermined gap by the hydrodynamic load generated in the groove when the rotor is rotated.

2. The turbine apparatus of claim 1, wherein the groove comprises a plurality of grooves, and wherein the grooves are arranged along a rotation direction of the rotor.

3. The turbine apparatus of claim 2, wherein the groove is formed in a step of the same depth along the circumferential direction from one end part (G1) of the groove to the other end part (G2) of the groove in the seal pad.

4. The turbine apparatus of claim 2, wherein the groove is formed in a step of the different depth along the circumferential direction in the seal pad.

5. The turbine apparatus of claim 4, wherein the step depth of the groove increases from one end part (G1) of the groove to the other end part (G2) of the groove toward the inside of the seal pad based on the rotation direction of the rotor.

6. The turbine apparatus of claim 2, wherein the spring comprises a coil spring or a bump foil spring in which one side thereof is supported by the chamber and the other side thereof is supported by the seal pad.

7. The turbine apparatus of claim 6, wherein the spring comprises a plurality of springs, wherein the springs are arranged along a rotation direction of the rotor.

8. The turbine apparatus of claim 7, wherein the springs are symmetrically formed with respect to a center of the seal pad in the rotation direction of the rotor.

9. The turbine apparatus of claim 2, wherein the seal pad comprises a plurality of seal pads, and wherein the seal pads are arranged in an annular shape along a rotation direction of the rotor.

10. The turbine apparatus of claim 9, wherein assuming that any one of the seal pads is referred to as an n-th seal pad, and a seal pad next to the n-th seal pad of the seal pads is referred to as an m-th seal pad, the n-th seal pad is formed to be spaced from the m-th seal pad.

11. The turbine apparatus of claim 10, wherein the n-th seal pad includes: an inner circumferential surface facing the rotor; an outer circumferential surface opposite to the inner circumferential surface; a first side facing the m-th seal pad; a second side opposite to the first side; a first front end surface bent from the inner circumferential surface, the outer circumferential surface, the first side, and the second side, and facing an upstream side of a working fluid; and a second front end surface opposite to the first front end surface,
   wherein the m-th seal pad includes: an inner circumferential surface facing the rotor; an outer circumferential surface opposite to the inner circumferential surface; a first side facing the n-th seal pad; a second side opposite to the first side; a first front end surface bent from the inner circumferential surface, the outer circumferential surface, the first side, and the second side, and facing an upstream side of a working fluid; and a second front end surface opposite to the first front end surface, and
   wherein the first side of the n-th seal pad and the first side of the m-th seal pad are formed to be spaced from each other.

12. The turbine apparatus of claim 11, wherein the first side of the n-th seal pad includes:
   a first part bent in the direction of a rotation axis of the rotor from the first front end surface;
   a second part bent in the rotation direction of the rotor from the first part;
   a third part bent in the rotation axis of the rotor from the second part;

a fourth part bent in the rotation direction of the rotor from the third part and opposite to the second part; and a fifth part bent in the direction of the rotation axis of the rotor from the fourth part and connected to the second front end surface of the n-th seal pad.

13. The turbine apparatus of claim 12, wherein the first side of the m-th seal pad includes:
  a first part bent in the direction of a rotation axis of the rotor from the first front end surface of the m-th seal pad and facing the first part of the first side of the n-th seal pad;
  a second part bent in the rotation direction of the rotor from the first part and facing the second part of the first side of the n-th seal pad;
  a third part bent in the rotation axis of the rotor from the second part and facing the third part of the first side of the n-th seal pad;
  a fourth part bent in the rotation direction of the rotor from the third part and facing the fourth part of the first side of the n-th seal pad; and
  a fifth part bent in the direction of the rotation axis of the rotor from the fourth part, connected to the second front end surface of the m-th seal pad, and facing the fifth part of the first side of the n-th seal pad.

14. The turbine apparatus of claim 13, wherein one of the second part of the first side of the n-th seal pad and the second part of the first side of the m-th seal pad is provided with at least one protrusion extending towards the other of the second parts,
  wherein one of the fourth part of the first side of the n-th seal pad and the fourth part of the first side of the m-th seal pad is provided with at least one protrusion extending towards the other of the fourth parts.

15. The turbine apparatus of claim 14, wherein at least one of the third part of the first side of the n-th seal pad and the third part of the first side of the m-th seal pad is provided with a cavity to guide a working fluid from a position between the seal pad and the rotor to a position between the third part of the first side of n-th seal pad and the third part of the first side of the m-th seal pad.

16. The turbine apparatus of claim 13, wherein one of the third part of the first side of the n-th seal pad and the third part of the first side of the m-th seal pad is provided with a static brush to be brought into contact with the other of the third part of the first side of the n-th seal pad and the third part of the first side of the m-th seal pad.

17. The turbine apparatus of claim 2, wherein the seal mechanism further includes an auxiliary seal pad provided to prevent a working fluid from leaking between the casing and the seal pad.

18. The turbine apparatus of claim 17, wherein the casing includes a groove formed to be engraved from the chamber, and wherein the auxiliary seal pad is inserted into the groove and is in contact with the seal pad.

19. The turbine apparatus of claim 18, wherein the auxiliary seal pad is formed in a circular shape in cross section perpendicular to the rotation direction of the rotor.

20. A turbine apparatus comprising:
  a stator;
  a rotor rotatably installed in the stator;
  a nozzle spraying steam;
  a bucket rotating the rotor using a rotational force from the steam injected from the nozzle;
  a sealing mechanism provided to prevent air or the steam from leaking between the stator and the rotor,
  wherein the sealing mechanism includes:
  a casing coupled to the stator and having a chamber opened toward the rotor;
  a seal pad accommodated in the chamber so as to be reciprocable in a rotationally radial direction of the rotor; and
  a spring applying an elastic force to the seal pad in a direction in which the seal pad approaches the rotor,
  wherein the seal pad includes an inner circumferential surface facing the rotor, and wherein the inner circumferential surface of the seal pad is provided with an engraved groove, the engraved groove configured to induce a hydrodynamic load, upon rotation of the rotor, in a direction of lifting the seal pad away from the rotor,
  wherein the sealing mechanism is brought into contact with the rotor when the rotor is stopped, and the sealing mechanism is lifted and spaced apart from the rotor by a predetermined gap by the hydrodynamic load generated in the groove when the rotor is rotated.

* * * * *